H. C. JARVIS.
TRAILER HITCH FOR TRUCKS.
APPLICATION FILED MAY 23, 1918. RENEWED OCT. 4, 1919.

1,322,112.

Patented Nov. 18, 1919.
2 SHEETS—SHEET 1.

Inventor
Herbert C. Jarvis.
By Henry L. Reynolds.
Attorney

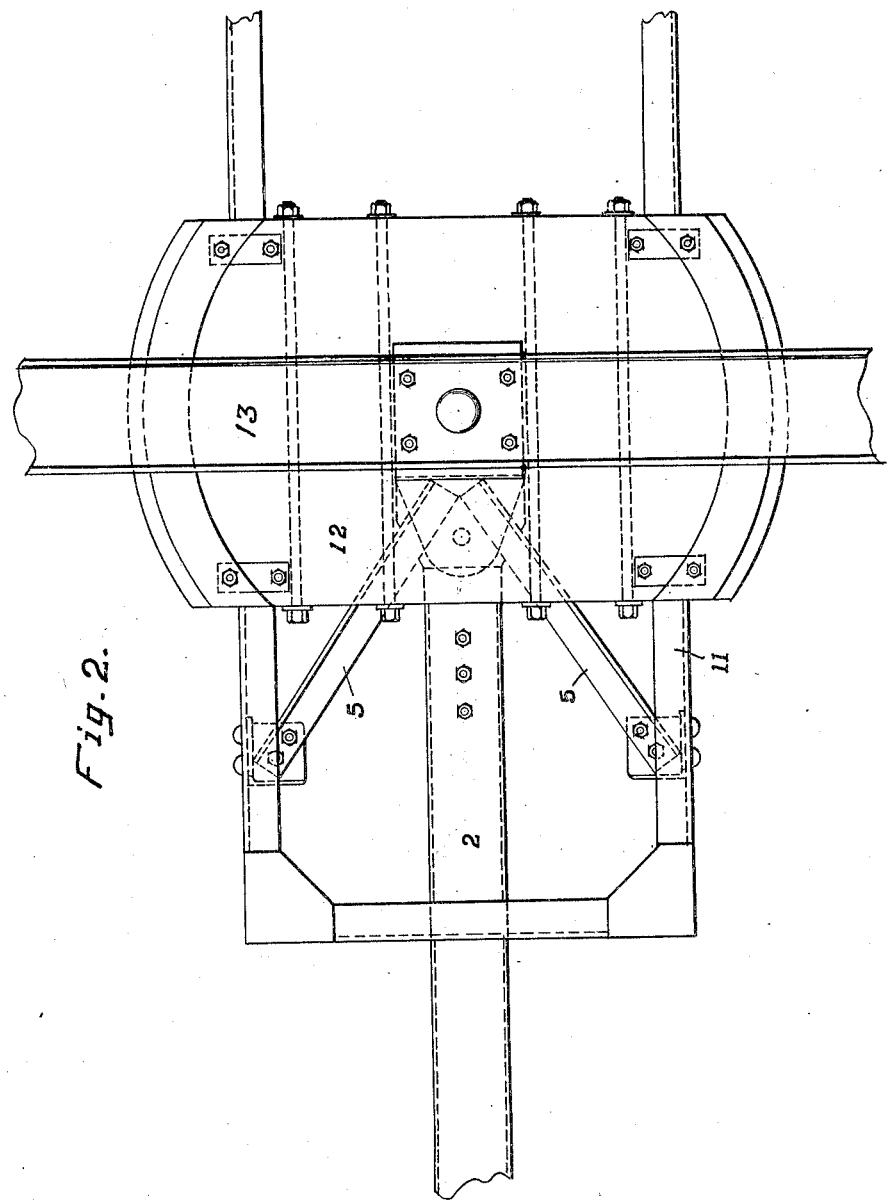

UNITED STATES PATENT OFFICE.

HERBERT C. JARVIS, OF RENTON, WASHINGTON, ASSIGNOR TO PACIFIC CAR & FOUNDRY CO., OF SEATTLE, WASHINGTON, A CORPORATION OF WASHINGTON.

TRAILER-HITCH FOR TRUCKS.

1,322,112.  Specification of Letters Patent.  Patented Nov. 18, 1919.

Application filed May 23, 1918, Serial No. 236,107. Renewed October 4, 1919. Serial No. 328,588.

*To all whom it may concern:*

Be it known that I, HERBERT C. JARVIS, a citizen of the United States, and resident of Renton, county of King, and State of Washington, have invented certain new and useful Improvements in Trailer-Hitches for Trucks, of which the following is a specification.

My invention relates to hauling hitches for trucks, that is, to devices employed to hitch a trailer or like load to the truck so that the truck may haul it.

The object of my invention is to provide a means whereby a strong draft connection may be made with a truck and in such manner that undue strains caused by the load being hauled will not be communicated to the truck driving gear in such manner as to injure it or tend to throw it out of line.

My invention comprises the novel parts and combinations of parts which will be disclosed in the following specification and particularly pointed out in the claims.

In the accompanying drawings I have shown my invention as embodied in the form of construction which is now most preferred by me. It is, however, not essential to my invention that it be embodied in the exact construction shown, the latter being given as a typical and desirable construction.

Fig. 2 is a top or plan view of the same parts.

Figs. 3 and 4 are respectively side and bottom view of the depending strut used to hitch to.

Figure 1:
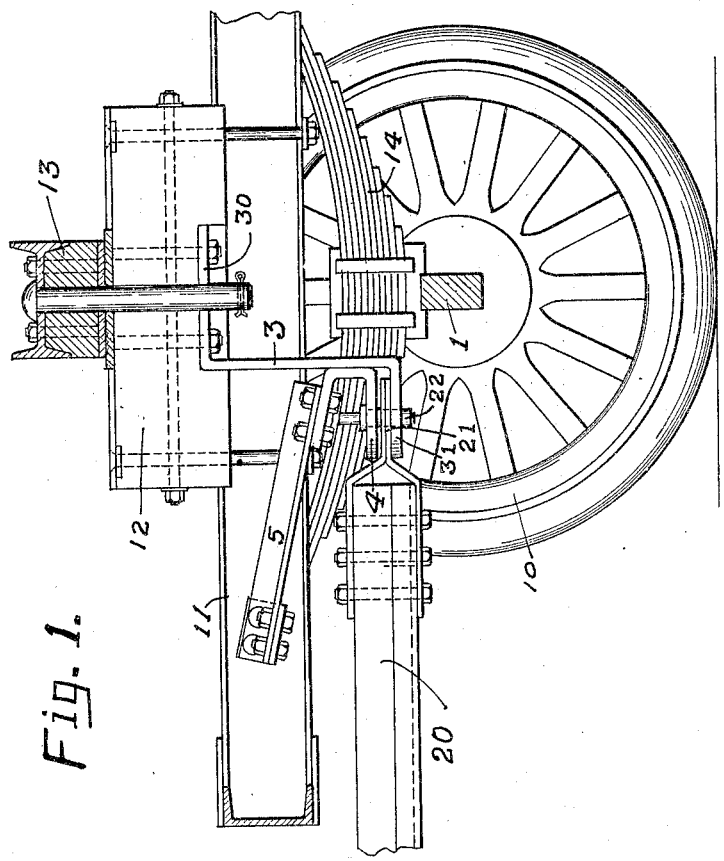
Figure 1 is a section, on a vertical plane extending lengthwise of the truck, of the rear end of a truck showing the manner of hitching thereto.
Figure 3:
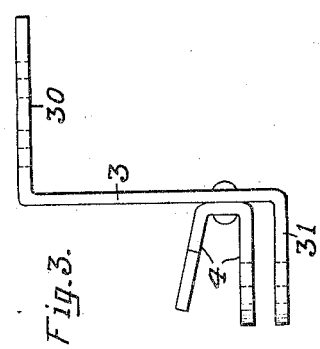
Figure 4:
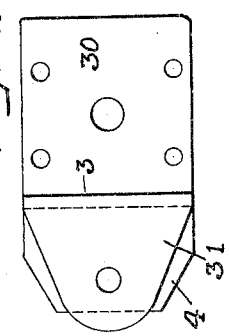

In hauling a trailer by a truck, and more especially so where the load is heavy and the surface rough, as for instance, when used in logging, it has been found objectionable to make the draft connection directly to the truck axle, as, when this is done, the driving mechanism by which the engine is connected with this axle is very apt to be pulled out of line, or its adjustment interfered with, in such a way as to seriously affect its working. At the same time it is desirable, for a number of practical reasons, to have the line of draft at about the level of the driving axle. The device which is the subject of this invention is designed to avoid the difficulties named and to secure the results desired.

In the device shown, 1 is the rear or driving axle of the truck, 10 the truck rear wheels, 11 the truck chassis, 12 the bunk base and 13 the bunk which is carried by the truck. The trailer is indicated as a whole by the character 2. The exact construction of the trailer not being essential to my invention, its construction will not be described in detail. It will suffice that in the trailer shown the draft is communicated through a reach 20.

The connection of the reach with the truck is through a strut which is supported in a central position from the chassis at such a point that the connection of the reach therewith is just to the rear of and substantially on a level with the truck rear axle.

The strut, as illustrated, is made of a stout flat bar of metal, bent to provide horizontal terminal sections and a vertical central section, the shape being substantially that of the cross section of a Z-bar. This shape is dictated mainly by convenience and cheapness of manufacture.

As it is very desirable to secure this on the center line of the truck and as a truck chassis has no frame member at this point, it is secured to the bunk base 12 which is interposed between the chassis and the bunk. The upper arm 30 is bolted securely to the bunk base. The central or depending section 3 is located just to the rear of the truck rear axle 1 and the lower horizontal section 31 is at about the level of the truck axle. As the chassis is supported from the axle through springs 14, the relative levels of these parts will vary somewhat under different conditions of load.

The lower horizontal section 31 extends rearwardly from the depending central section 3. The hitch of the reach 20 is secured to this. I prefer to secure another plate 4 to the strut to provide a member parallel with but separated from the end 31, between which two parts, the bars 21, which are secured to the end of the reach pass, these being secured together by a pin 22.

I also provide brace or stay bars 5 for the strut, these connecting the lower part of the strut with the chassis and extending in a laterally diverging direction from the strut, so as to brace it against strains acting transversely of the truck as well as the draft strains.

For convenience the plate 4 has been made of a U-shape, its base being secured to the vertical central part of the strut at an elevation to place its lower leg parallel with and suitably removed from the end 31 of the strut to accommodate the end of the reach between them, and its upper leg forming a convenient member to which to secure the ends of the brace bars 5.

I have found that this method of hitching the trailer to the truck provides ample strength and relieves the rear axle and the power transmission mechanism of the sudden strains caused by rough surfaces and irregular draft strains, thus maintaining the hauling mechanism in better shape than when the draft is otherwise communicated to the trailer.

What I claim as my invention is:

1. A hauling hitch for automobile trucks comprising a beam extending across and secured to the chassis, a strut supported by and extending downwardly from the said beam, just rearward of the truck rear axle and provided with a draft connection substantially at the level of the truck axle, and brace bars connecting the lower part of the strut with the chassis and extending in a laterally diverging direction.

2. The combination with the side bars of an automobile chassis, a bunk base transversely connecting and secured to said side bars, a bunk mounted on the bunk base, and a draft device for a trailer comprising a bracket fixed to the bunk base and extending downward rearwardly of the axle and having draft connecting means at its lower end, and brace bars extending diagonally from the lower end of said bracket to the side bars of the chassis.

3. The combination with an automobile chassis of a bunk base extending transversely of and secured to the chassis and a draft bracket having one arm secured to the bunk base and extending downwardly just in the rear of the axle and two struts extending from the lower end of said arm in a fore-and-aft diagonal direction to a connection with the side members of the chassis.

4. A hauling hitch for trucks comprising a bar having ends bent substantially at right angles with its central portion, one end of said bar being fixedly supported from the truck chassis and the other end being rearwardly of and substantially level with the truck axle and extending rearwardly, a U-shaped plate secured by its base to the central part of said bar with one arm parallel with and separated from the lower horizontal end of said bar, said ends of the two members having holes for receiving a draft pin, and brace rods secured to the other arm of the U-shaped plate and extending in a laterally diverging direction with their outer ends secured to the truck chassis.

5. A hauling hitch for trucks comprising a strut bar having its ends bent at substantially right angles to and in opposite directions from its central portion, one end being fixedly supported from the chassis centrally over the rear axle and the other end being rearwardly of and substantially on a level with said axle and extending rearwardly, a supplemental plate secured to said strut with one end in spaced parallel relation to the lower end of the strut, said ends of both parts having draft-pin-receiving holes, and brace bars connecting the lower part of the strut with the chassis.

6. The combination with a four-wheeled automobile truck of a bunk base secured to the chassis above the rear axle, a draft bracket secured to the bunk base and extending downwardly to a point adjacent the axle, and means for making a haulage hitch to the lower part of said bracket and at a point closely adjacent to but not rigidly connected with said axle.

7. A hauling hitch for four-wheeled automobile trucks comprising a beam extending transversely across and secured to the chassis of the truck, a bracket arm secured to this beam and extending downwardly just to the rear of the rear axle and provided with means for haulage connection therewith at a point closely adjacent to the axle.

8. The combination with an automobile truck of a bunk base carried by the chassis over the rear axle of the truck, a bunk secured upon said base to swing about a vertical pivot, a bracket secured to the bunk base and extending downward just rearward of the axle and approximately in alinement with the pivot of the bunk, and means for hitching the reach of a trailer to said bracket at its lower end.

Signed at Renton, Washington, this 6th day of May 1918.

HERBERT C. JARVIS.